(12) United States Patent
Iwanaga et al.

(10) Patent No.: US 9,348,837 B2
(45) Date of Patent: May 24, 2016

(54) INDEX WRITING IN A LINEAR TAPE FILE SYSTEM

(71) Applicant: International Business Machines Corporation, Armonk, NY (US)

(72) Inventors: Masayuki Iwanaga, Tiba-ken (JP); Yumiko Ohta, Yokohama (JP); Yutaka Oishi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 14/097,352

(22) Filed: Dec. 5, 2013

(65) Prior Publication Data

US 2015/0161161 A1    Jun. 11, 2015

(51) Int. Cl.
*G06F 17/30* (2006.01)

(52) U.S. Cl.
CPC .... *G06F 17/30182* (2013.01); *G06F 17/30091* (2013.01)

(58) Field of Classification Search
CPC .......... G06F 17/30321; G06F 11/1458; G06F 11/1448; G06F 11/1469; G06F 3/0682; G06F 2212/213; G11B 27/032; G11B 27/107
USPC ......... 707/625, 646, 684, 673, 711, 741, 821; 711/162; 714/15, 6.12
See application file for complete search history.

(56) References Cited

U.S. PATENT DOCUMENTS

| | | | |
|---|---|---|---|
| 6,785,786 B1 * | 8/2004 | Gold | G06F 11/1461 711/162 |
| 7,941,619 B1 * | 5/2011 | Rossi | G06F 11/1458 707/625 |
| 8,954,663 B1 * | 2/2015 | Klein | G06F 3/0619 711/111 |
| 2008/0133827 A1 * | 6/2008 | Topham | G06F 3/0607 711/111 |
| 2008/0151291 A1 * | 6/2008 | Ohno | G06F 17/3028 358/1.15 |
| 2011/0196840 A1 * | 8/2011 | Barzilai | G06F 11/1458 707/645 |
| 2011/0238716 A1 * | 9/2011 | Amir | G06F 3/0611 707/823 |
| 2011/0238906 A1 * | 9/2011 | Amir | G06F 3/0611 711/111 |
| 2012/0179867 A1 * | 7/2012 | Chakravarty | G06F 17/30858 711/111 |
| 2013/0148227 A1 * | 6/2013 | Tofano | G06F 3/0608 360/48 |
| 2015/0149415 A1 * | 5/2015 | Iwanaga | G06F 11/1469 707/684 |

* cited by examiner

*Primary Examiner* — Dennis Truong
(74) *Attorney, Agent, or Firm* — Stephen J. Walder, Jr.; Randall J. Bluestone

(57) ABSTRACT

Mechanisms are provided for performing a synchronization operation for synchronizing data to a tape medium. The mechanisms receive a request to perform the synchronization operation on the tape medium and obtain file information from a storage device in response to the request. The mechanisms determine if the file information is associated with a file that has been changed since a last index was written to the tape medium. In response to the file information being determined to be associated with a file that has been changed since a last index was written to the tape medium, the mechanisms add index information corresponding to the file information to a partial index. The partial index comprises index information for files less than a total number of files recorded on the tape medium. The mechanisms write the partial index to the tape medium.

20 Claims, 8 Drawing Sheets

INDEX WRITING IN A LINEAR TAPE FILE SYSTEM

BACKGROUND

The present application relates generally to an improved data processing apparatus and method and more specifically to mechanisms for performing index writing in a linear tape file system.

Linear Tape File System (LTFS) refers to both the format of data recorded on magnetic tape media and the implementation of specific software that uses this data format to provide a file system interface to data stored on magnetic tape. The Linear Tape File System format is a self-describing tape format developed by International Business Machines (IBM) Corporation of Armonk, N.Y. to address tape archive requirements. The LTFS Format specification defines the organization of data and metadata on tape, where the files are stored in a hierarchical directory structure. Data tapes written in the LTFS Format can be used independently of any external database or storage system allowing direct access to file content data and file metadata. This format makes it possible to implement software that presents a standard file system view of the data stored in the tape media. This file system view makes accessing files stored on the LTFS formatted media similar to accessing files stored on other forms of storage media such as disk or removable flash drives.

As mentioned above, in LTFS, in addition to the storing of the content of a file itself into a tape medium, metadata that relates to the file is also stored. This metadata may include data referred to as an index, such as a Universally Unique Identifier (UUID) used for identifying the file, the name of the file, etc., is stored into the tape medium, such as in an Extendible Markup Language (XML) file format. In the existing LTFS Format, it is not permitted to divide an index into a plurality of XML files. The task of storing an index on the tape medium is referred to as a synchronization or "sync" task or operation. A user can select the timing of the execution of the sync operation by configuring the settings at the time of the startup of the LTFS system. Examples of the timing of the execution of a sync operation include periodical execution, execution at the time of the closing of a file, and execution at the time of the unmounting, or dismounting, of a tape medium. "Mounting" a tape medium refers to making the tape medium accessible and providing a group of files in a file system structure of the tape medium accessible to a user or user group. Thus, to unmounts, or dismount, a tape medium is to make the tape medium no longer accessible or the remove the files from access by a user or user group. As part of the unmounting of a tape medium, information is stored to the tape medium for use in accessing the files on the tape medium when the tape medium is again mounted.

In LTFS, to perform the writing and reading of a file on a tape medium, it is necessary to initialize the tape medium by means of the LTFS Format before writing and reading. When the tape medium is initialized in LTFS, the tape medium is divided into two partitions for use. One of the two partitions is referred to as the Index Partition (IP) and the other is referred to as the Data Partition (DP). When a user uses an LTFS system for writing onto the tape medium, in addition to the content of the file itself being written to the DP, pieces of metadata, i.e. the index, is written to the IP. The index can contain information such as the name of the file, the data of the creation of the file, and the like. The latest index for the file is written to the IP whereas the content of the file and the history of the index are written to the DP.

SUMMARY

In one illustrative embodiment, a method, in a data processing system comprising a tape storage device that reads and writes data to a tape medium, for performing synchronization operation for synchronizing data to the tape medium is provided. The method comprises receiving a request to perform the synchronization operation on the tape medium and obtaining file information from a storage device of the data processing system in response to receiving the request. The method further comprises determining if the file information is associated with a file that has been changed since a last index was written to the tape medium. In addition, the method comprises, in response to the file information being determined to be associated with a file that has been changed since a last index was written to the tape medium, adding index information corresponding to the file information to a partial index. The partial index comprises index information for files less than a total number of files recorded on the tape medium. Moreover, the method comprises writing the partial index to the tape medium.

In another illustrative embodiment, a method, in a data processing system comprising a tape storage device that reads and writes data to a tape medium, for mounting the tape medium is provided. The method comprises receiving a request to mount the tape medium in the tape storage device. The tape medium comprises at least one full index stored on the tape medium and at least one partial index stored on the tape medium. The method further comprises identifying a most recent generation index that is a full index stored on the tape medium and reading first index information from the full index. The method also comprises iteratively reading second index information from each partial index stored on the tape medium having a generation identifier that is more recent than the most recent generation index that is a full index. Furthermore, the method comprises building an index of all files stored on the tape medium from the first index information second index information and mounting the tape medium using the index of all files stored on tape medium.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
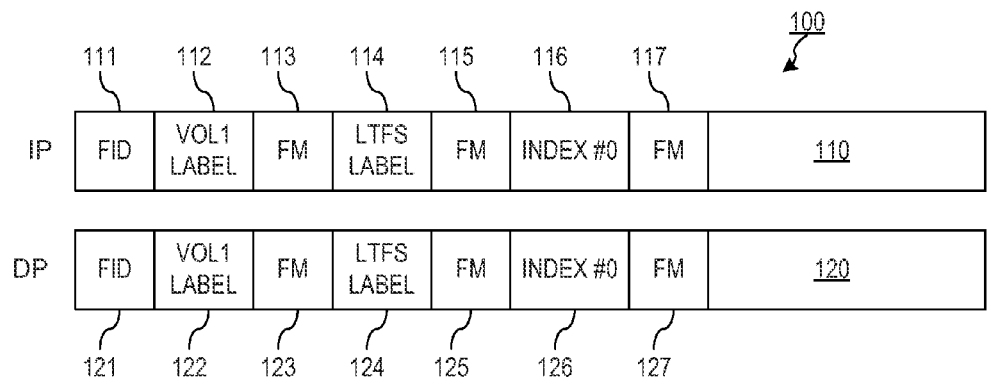
FIG. 1 is an example diagram illustrating data written to a tape medium immediately after the initialization of the tape medium by means of a Linear Tape File System (LTFS) Format implementing system.

FIG. 1 is an example diagram illustrating data written to a tape medium immediately after the initialization of the tape medium by means of a Linear Tape File System (LTFS) Format implementing system. FIG. 1 shows both the Index Partition (IP) and the Data Partition (DP) of the tape medium and the corresponding information stored in these partitions as a result of the write operation. It should be appreciated that the term "label" as used herein refers to an organization of data or metadata for specifying characteristics of the tape medium 100 or data stored on the tape medium 100.

As shown in FIG. 1, the IP 110 comprises a Format Identification Data (FID) set 111, a Volume 1 Label 112, a File Mark (FM) 113, a LTFS Label 114, a second FM 115, an Index #0 116, and a third FM 117. The FID set 111 is a special type of data that is written at the head of a tape medium when a tape drive initializes the tape medium 100. The FID set 111 contains information on the number of partitions on the tape medium 100, information on the capacity of each of the partitions, and the like. The Volume 1 Label 112, which is referred to as an American National Standards Institutes (ANSI) label, is a label in a general format, specified in ANSI as its alias.

The LTFS Label 114 is a label that is specified in the LTFS format. This label contains information on the specific version of the LTFS format of the tape medium 100, i.e. the LTFS format used to format the tape medium 100 and with which the tape medium 100 conforms. The FMs 113, 115, and 117 are marks that are typically used in a tape medium 100 for the purpose of locating the start position of data for data seek operations.

The Index #0 116 is an index that is written at the time of formatting. Though this index does not contain any unique-to-file information because no file exists at the time of initialization, information such as the volume name of the tape medium 100 is written into this index for storage. Indexes are often stored as Extensible Markup Language (XML) files where all of the index information for all of the files stored on the tape medium is represented in a single index file.

It should be noted that the same information is written to both the IP 110 and the DP 120 at initialization of the tape medium 100. Thus, the fields of data 121-127 of the DP 120 store the same information as corresponding ones of the fields 111-117 in the IP 110.

Figure 2:
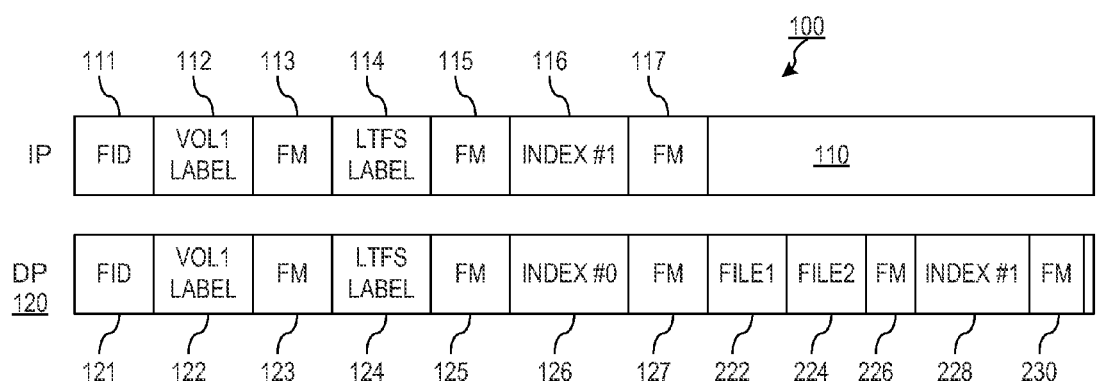
FIG. 2 illustrates data that is written to a tape medium as a result of the writing of a first and second file to the tape medium after initialization of the tape medium using an LTFS format.

FIG. 2 illustrates data that is written to a tape medium as a result of the writing of a first and second file to the tape medium after initialization of the tape medium using an LTFS format. In the diagram shown in FIG. 2, shaded elements are elements added/updated as a result of the writing of the first and second files to the tape medium 100.

As shown in FIG. 2, the Index #0 116 that was written during initialization in the IP 110 is overwritten or updated to reference Index#1 210 with subsequent FM 212. Moreover, the first file (File 1) 222, second file (File 2) 224, FM 226, Index #1 228, and FM 230 are written to the DP 120 of the tape medium 100. Index #1 228 contains the information of File 1 222 and the information of File 2 224, such as the name of the file, the date of creation of the file, and/or the like. In the IP 110, only the latest index, i.e. Index #1 210, is stored. The latest index in the IP 110 is written at the time of unmounting (or dismounting) of the tape medium. The LTFS may write an index in the DP 120 periodically. The reason why LTFS writes the index in the DP 120 periodically but not in the IP 110 periodically is that changing the partition between IP 110 and DP 120 requires several seconds and the cost is too high to do so on a periodic basis. The index written in the IP 110 is always the latest index only for indexing the latest write of data to the DP 120. In the DP 120, files and indices are written as data is written to the DP 120 without overwriting existing indices.

In LTFS, the indices contain information that is referred to as "generation" information. The generation information of an index is incremented each time a new index is created and thus, indicates the particular generation or version of the index. A LTFS mechanism refers to the index of the latest generation to determine what kinds of files exist in a tape medium. The indices are often used with a rollback function of the LTFS mechanisms which provides a functionality for using a file that has already been deleted or a "before-update" file by referring to the index of a previous generation instead of referring to the index of the latest generation.

The capacity of an index depends on the amount of information that is affixed to each file. In general, the capacity of an index is approximately 1 GB when the number of files is one million. It is difficult to store and retain all pieces of index information on a memory, although how difficult it will be depends on the number of files recorded on the tape medium 100. For this reason, a function referred to as the disk cache (dCache) exists. dCache is a function usually used to store information into a hard disk drive which operates as a cache for the information, and then reading the information from the hard disk drive into a memory when necessary.

During a dismount (or unmount) operation, the LTFS attempts to close the mounted tape medium by performing a synchronization of cached data, e.g., data stored in a dCache if a dCache is utilized, performing a write of a current index file to the tape medium, and then performing a write of consistency-related data to the linear tape cartridge memory. If a dCache functionality and hard disk drive (HDD) are used, all pieces of index information stored on the HDD are read out at the time of the synchronization operation of the dismount (or unmount) being executed, in order to perform Extensible Markup Language (XML) file creation on the tape medium. Therefore, the time taken for the synchronization execution of a dismount (or unmount) operation, in which a dCache is utilized, is proportional to the number of files, which causes a bottleneck in accessing the HDD.

Taking one example, consider the measurement of time taken for dismounting a tape medium under the condition of the addition of one file to a tape medium in which 50,000 files had already been written in advance and a dCache is utilized. It has been observed that it takes approximately 600 seconds to perform dismounting. In general, it takes approximately 20 seconds for dismounting the tape medium in a case where index information is stored in a memory without using the dCache function. Time taken for aligning (adjusting the position of) the tape medium and taking the tape medium out of the tape drive accounts for the majority of this 20 second operation time period. Therefore, time taken for creating/writing index information is sufficiently short. For example, since the capacity of a tape cartridge that is in the $6^{th}$ generation LTO format is 2.5 TB, it is possible to store 2.5 million files on the tape cartridge, when the files have a size of 1 MB. If the ratio of compression is taken into consideration, it follows that the number of files that can be stored is several times larger than 2.5 million.

In some implementations, organizations have the need to store vast amounts of information in LTFS based tape medium systems, where each piece of information stored has an average size of approximately 10 KB. Guaranteeing high performance of such LTFS based tape medium systems is a crucial issue. If the dCache function is used, it is inevitable that time taken for dismounting, or unmounting, a tape medium becomes prohibitively long as the synchronization operation requiring the reading out of the index information stored on the tape medium become longer due to the increased size of the index.

The illustrative embodiments provide mechanisms for performing index writing in a linear tape file system. In accordance with some illustrative embodiments, rather than writing a full index to the tape medium when there is an update to a file, the illustrative embodiments provide mechanisms for performing writes of partial indexes. That is, the index is divided into a plurality of files, e.g., XML files, and when a synchronization (sync) operation is performed, such as when the tape medium is unmounted, instead of writing the entire index into the tape medium, a partial index is written that includes only the changed portions of the index. In other illustrative embodiments, while a partial index is again written to the tape medium in response to a synchronization operation, the partial index contains the information of the files located on the same path as that of an added/changed file that causes a change in the index. By using partial indexes in accordance with either of these illustrative embodiments, the mechanisms of these illustrative embodiments reduce the time taken for index writing.

In still further illustrative embodiments, improvements to index writing are achieved by representing a directory that includes a large number of files as a set of virtual directories. The LTFS is modified to permit the division of an index into a plurality of XML files. When a synchronization operation is performed, such as part of a dismount (or unmount) operation for dismounting a tape medium, instead of writing the entire index into a tape medium from a dCache, a partial index is written into the tape medium, where the partial index contains only the information for the files that belong to, and are included in, a virtual directory that includes the added/updated file. In this way, the time taken for index writing is again reduced and thus, the dismount (or unmount) operation for dismounting of a tape medium is reduced.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium is a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium is any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

Figure 3:
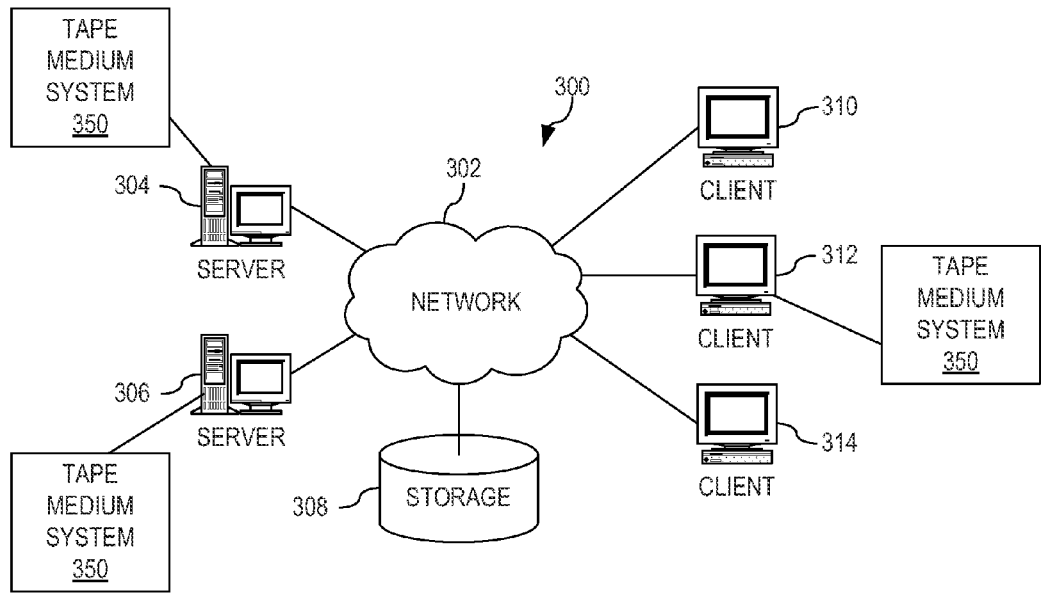
FIG. 3 is an example diagram of a distributed data processing system in which aspects of the illustrative embodiments may be implemented.

FIG. 3 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 300 contains at least one network 302, which is the medium used to provide communication links between various devices and computers connected together within distributed data processing system 300. The network 302 may include connections, such as wire, wireless communication links, or fiber optic cables.

In the depicted example, server 304 and server 306 are connected to network 302 along with storage unit 308. In addition, clients 310, 312, and 314 are also connected to network 302. These clients 310, 312, and 314 may be, for example, personal computers, network computers, or the like. In the depicted example, server 304 provides data, such as boot files, operating system images, and applications to the clients 310, 312, and 314. Clients 310, 312, and 314 are clients to server 304 in the depicted example. Distributed data processing system 300 may include additional servers, clients, and other devices not shown.

In the depicted example, distributed data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 3 is intended as an example, not as an architectural limitation for different embodiments of the present invention, and therefore, the particular elements shown in FIG. 3 should not be considered limiting with regard to the environments in which the illustrative embodiments of the present invention may be implemented.

In accordance with the illustrative embodiments, one or more of the computing devices in FIG. 3 may be used in conjunction with a tape medium system 350. For example, in the depicted example, a server 306 may have an associated tape medium system 350 which may be used for storing data useable by the server 306 or clients of the server 306. In one illustrative embodiment, the tape medium system 350 may be used as a backup system for backing up data stored in the hard disk drive (HDD), memory, or the like, of the server 306.

The tape medium system 350 may utilize a LTFS or other file system that is augmented to implement logic and functionality for using partial index writes in accordance with the illustrative embodiments. That is, a storage controller of the tape medium system 350 may comprise logic for performing partial index write operations for only the portions of an index that have changed or for files that are on a same path as a file that has been added or changed and causes a change in the index of the files, in response to a synchronization operation being performed. Moreover, the storage controller of the tape medium system 350 may comprise logic for managing virtual directories of files, maintaining partial indexes in association with the virtual directories, and writing the partial index files based on the files of the virtual directories of the IP and DP of the tape medium in response to a synchronization operation, such as an unmounting of the tape medium.

Figure 4:
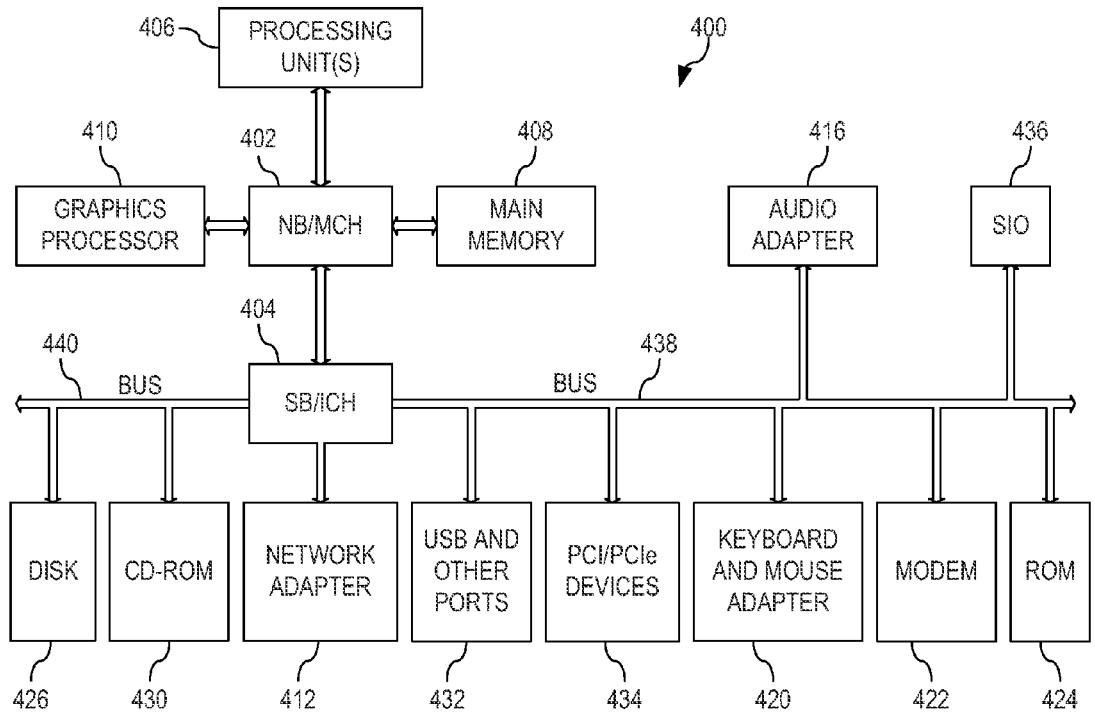
FIG. 4 is an example block diagram of a computing device in which aspects of the illustrative embodiments may be implemented.

FIG. 4 is a block diagram of an example data processing system in which aspects of the illustrative embodiments may be implemented. Data processing system 400 is an example of a computer, such as client 310 or server 306 in FIG. 3, in which computer usable code or instructions implementing the processes for illustrative embodiments of the present invention may be located.

In the depicted example, data processing system 400 employs a hub architecture including north bridge and memory controller hub (NB/MCH) 402 and south bridge and input/output (I/O) controller hub (SB/ICH) 404. Processing unit 406, main memory 408, and graphics processor 410 are connected to NB/MCH 402. Graphics processor 410 may be connected to NB/MCH 402 through an accelerated graphics port (AGP).

In the depicted example, local area network (LAN) adapter 412 connects to SB/ICH 404. Audio adapter 416, keyboard and mouse adapter 420, modem 422, read only memory (ROM) 424, hard disk drive (HDD) 426, CD-ROM drive 430, universal serial bus (USB) ports and other communication ports 432, and PCI/PCIe devices 434 connect to SB/ICH 404 through bus 438 and bus 440. PCI/PCIe devices may include, for example, Ethernet adapters, add-in cards, and PC cards for notebook computers. PCI uses a card bus controller, while PCIe does not. ROM 424 may be, for example, a flash basic input/output system (BIOS).

HDD 426 and CD-ROM drive 430 connect to SB/ICH 404 through bus 440. HDD 426 and CD-ROM drive 430 may use, for example, an integrated drive electronics (IDE) or serial advanced technology attachment (SATA) interface. Super I/O (SIO) device 436 may be connected to SB/ICH 404.

An operating system runs on processing unit 406. The operating system coordinates and provides control of various components within the data processing system 400 in FIG. 4. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 400.

As a server, data processing system 400 may be, for example, an IBM® eServer™ System p® computer system, running the Advanced Interactive Executive (AIX®) operating system or the LINUX® operating system. Data processing system 400 may be a symmetric multiprocessor (SMP) system including a plurality of processors in processing unit 406. Alternatively, a single processor system may be employed.

Instructions for the operating system, the object-oriented programming system, and applications or programs are located on storage devices, such as HDD 426, and may be loaded into main memory 408 for execution by processing unit 406. The processes for illustrative embodiments of the present invention may be performed by processing unit 406 using computer usable program code, which may be located in a memory such as, for example, main memory 408, ROM 424, or in one or more peripheral devices 426 and 430, for example.

A bus system, such as bus 438 or bus 440 as shown in FIG. 4, may be comprised of one or more buses. Of course, the bus system may be implemented using any type of communication fabric or architecture that provides for a transfer of data between different components or devices attached to the fabric or architecture. A communication unit, such as modem 422 or network adapter 412 of FIG. 4, may include one or more devices used to transmit and receive data. A memory may be, for example, main memory 408, ROM 424, or a cache such as found in NB/MCH 402 in FIG. 4.

In accordance with the illustrative embodiments, the bus 440 or other I/O interface of the data processing system 400, provides a communication interface through which data may be communicated to/from a tape storage system, such as tape medium system 350 in FIG. 3. The tape medium system 350 may store backups of the data in a storage device, such as the HDD 426, a flash memory, or other type of storage device, for example, may provide a file system, e.g., LTFS, through which processes of the data processing system 400 accesses files stored on one or more tape media mounted in the tape storage system, or the like. In accordance with the illustrative embodiments, the data processing system 400 operates on conjunction with a tape storage system controller that implements a file system comprising logic and functionality for implementing the mechanisms of the illustrative embodiments.

Those of ordinary skill in the art will appreciate that the hardware in FIGS. 3 and 4 may vary depending on the implementation. Other internal hardware or peripheral devices, such as flash memory, equivalent non-volatile memory, or optical disk drives and the like, may be used in addition to or in place of the hardware depicted in FIGS. 3 and 4. Also, the processes of the illustrative embodiments may be applied to a multiprocessor data processing system, other than the SMP system mentioned previously, without departing from the spirit and scope of the present invention.

As discussed above, in most cases an index is treated as a single XML file and is stored into the IP and DP of a tape medium as a single file. If there is no change at all in the content of the index, the process of overwriting the index that is already written to the IP of the tape medium as described above, with another index that has completely the same content as the content of the already written index in the IP is not performed at the time of the synchronization operation, e.g., unmounting of the tape medium. On the other hand, if there is any change in the content of the index, such as in the case where a file (including a directory) has been added, deleted, or modified, to cause a change in the content of the index, an index file (e.g., XML file) is created that represents the latest state of information and, as illustrated in FIG. 2, is used to overwrite the already existing index in the IP of the tape medium.

To the contrary, with the mechanisms of the illustrative embodiments, instead of a full index being generated as an index file and being written to the IP or DP of the tape medium, a partial index is generated and saved. That is, rather than a full index that contains the information of all of files on the tape medium, the partial index contains only the information of files that belong to, and are included in, portions of the files associated with the added, deleted, or modified file(s) (hereafter the terms "change" and "changed" will be used to refer to any operation that either adds, deletes, or modifies a file or index). In one illustrative embodiment, the partial index may comprise the information only for the portion of the index that is changed due to the change in the file(s) stored on the tape medium. In another illustrative embodiment, the partial index may comprise the information for the portion of the index that is changed due to the change in the particular file, but may also include index information for files that are on a same path as the changed file, where the "path" is the directory location of the file.

Thus, with the mechanisms of the illustrative embodiments, rather than writing an entire full index each time a synchronization operation occurs, such as unmounting of the tape medium, a partial index is written that only includes the information that has changed since the last writing of an index to the tape medium. Since a partial index is stored instead of writing an entire index, the partial index is modified to include a partial flag value. The partial flag value indicates whether the index contains the information of all of the files recorded on the tape medium or contains a partial index having information for only a subset of the files recorded on the tape medium.

Figure 5:
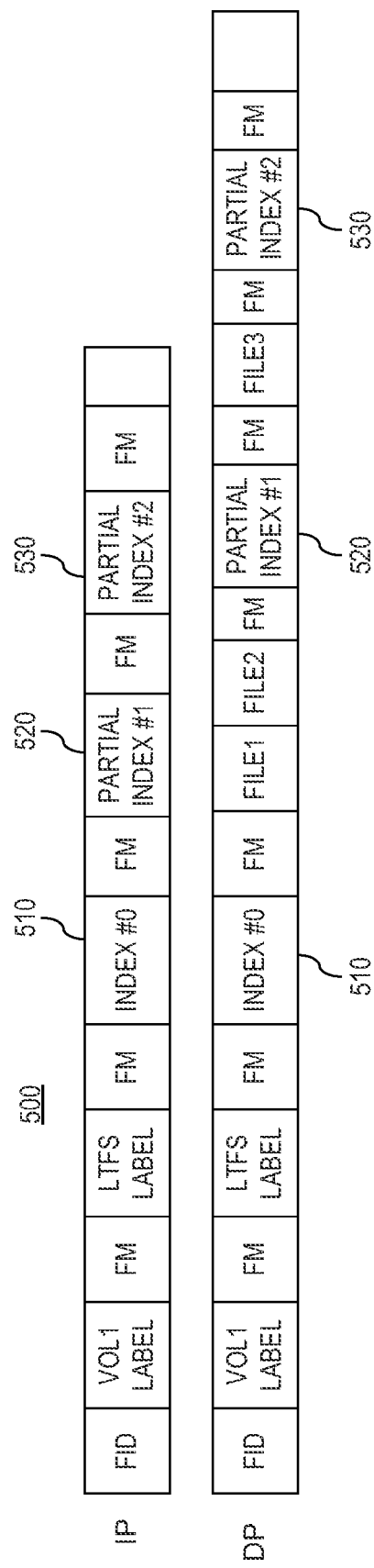
FIG. 5 illustrates the writing of partial indexes to the tape medium in response to a synchronization operation in accordance with illustrative embodiments set forth herein.

FIG. 5 illustrates the writing of partial indexes to the tape medium in response to a synchronization operation in accordance with illustrative embodiments set forth herein. As discussed above with regard to FIG. 2, in known tape medium systems, when a synchronization operation is performed, such as part of an unmounting of a tape medium, an index is written to the tape medium that provides index information for all of the files recorded on the tape medium. As a result, multiple copies of indices may be stored on the tape medium where a majority of the information in the index is identical to a previous index already written to the tape medium. For example, in FIG. 2, index#1 will have a majority of the same index information in it as index#0 with the differences being the changes in the index information due to changes to the files on the tape medium after the writing of index#0. However, even though the only differences are due to the changes to the files subsequent to writing index#0, the entire index still must be written again to the tape medium as index#1, including those portions of the index that have not changed.

Contrary to this mechanism, the illustrative embodiments allow for partial index writes to be performed in response to a synchronization operation. As shown in FIG. 5, a full index 510 (Index#0) is written to the tape medium 500 at initialization of the tape medium 500. Thereafter, partial indices 520 and 530 are written to the tape medium 500 in response to synchronization operations, such as the unmounting of the tape medium 500. In the depicted example, it can be seen that files 1 and 2 were added to the tape medium 500 after the writing of the full index 510. Thus, partial index 520 (index#1) will include only the index information for files 1 and 2 and will not include a full index as in index 510. Similarly, subsequent to the writing of partial index 520, file 3 is added to the tape medium 500. As a result, partial index 530 (index#2) will include only the index information for file 3 and does not include the index information for files 1 or 2 or the additional index information that is written in the full index 510.

It should be appreciated that the example depicted in FIG. 5 only illustrates the partial indices 520 and 530 including information for files that have been added to the tape medium, however the illustrative embodiments are not limited to such. Rather, any files that may have been added, deleted, or modified (i.e. changed files) may give rise to a change in the index information and thus, the partial index would include information for any such changed files. Information regarding which files have been added, deleted, or modified since a last write of an index to the tape medium may be maintained by the file system as the files are added, deleted, or modified and may be reset with each subsequent write of an index to the tape medium. Thus, for example, if file 1 were changed subsequent to the writing of partial index 520 in FIG. 5, then partial index 530 would contain information for file 1 as well as information for file 3. Hence, in accordance with one illustrative embodiment, the partial indices may include information for only those files that have been changed since the writing of a last index or partial index.

Figure 6:
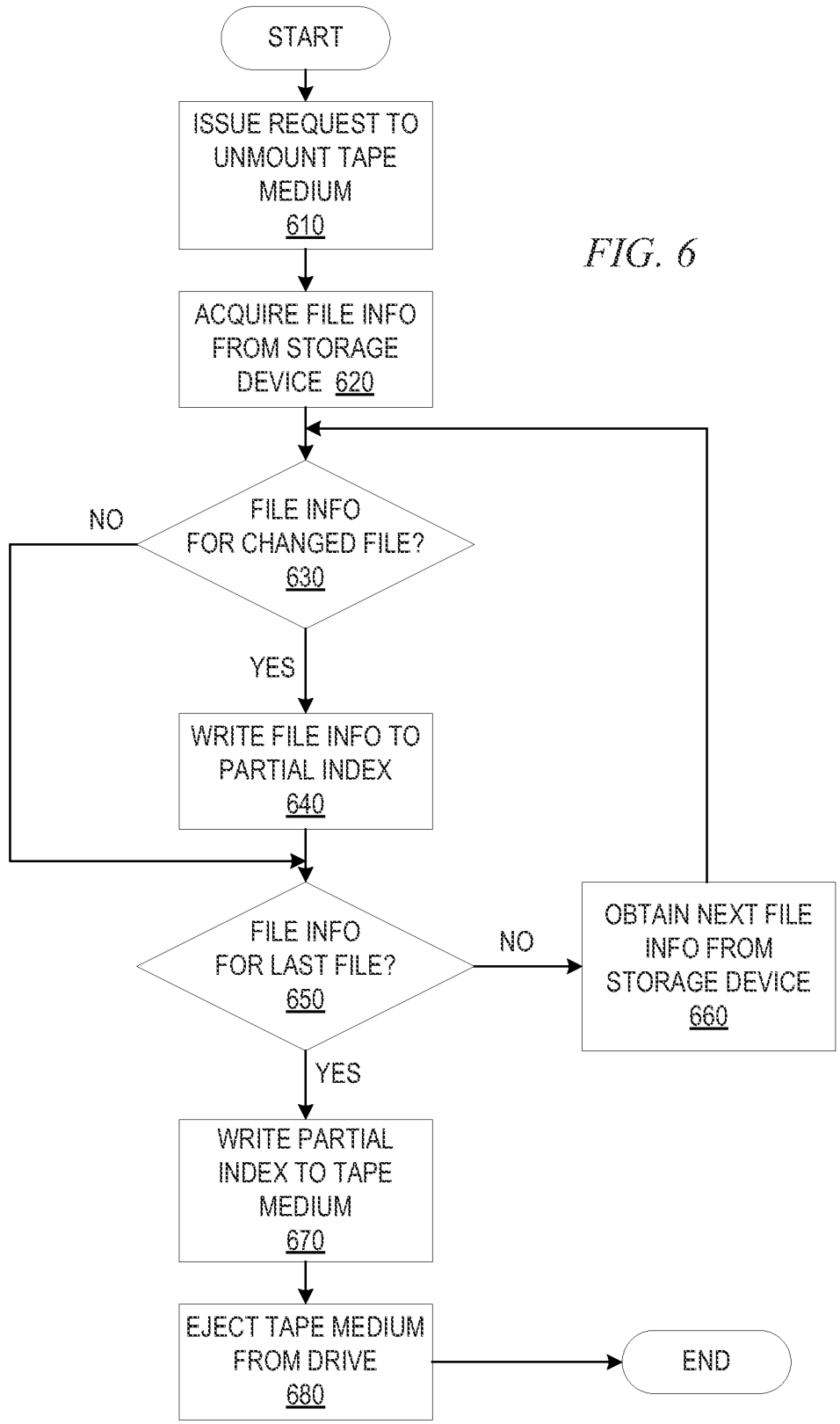
FIG. 6 illustrates a flowchart outlining an example operation for writing a partial index to a tape medium in accordance with one illustrative embodiment.

FIG. 6 illustrates a flowchart outlining an example operation for writing a partial index to a tape medium in accordance with one illustrative embodiment. As shown in FIG. 6, the operation starts with the file system (e.g., LTFS) issuing a request for unmounting of a tape medium (step 610). File information for a file stored in a storage device, such as a hard disk drive, flash memory device, or other type of storage device, is acquired (step 620) and a determination is made as to whether the file has been changed (added, deleted, or modified) since the writing of a last index to the tape medium (step 630). If not, then the operation jumps to step 650. If the file has been changed since the last index was written to the tape medium (step 630), then the index information for the file is written to a partial index (step 640). The operation then determines if this is the information for the last file stored in the storage device (a hard disk drive being only one non-limiting example) (step 650). If not, then the file system acquires the next file information from the storage device (step 660) and returns to step 630. If the information is for the last file in the storage device (step 660), the index is then written to the tape medium (step 670), the tape medium is ejected from the tape drive (step 680), and the unmounting operation is terminated.

Figure 7:
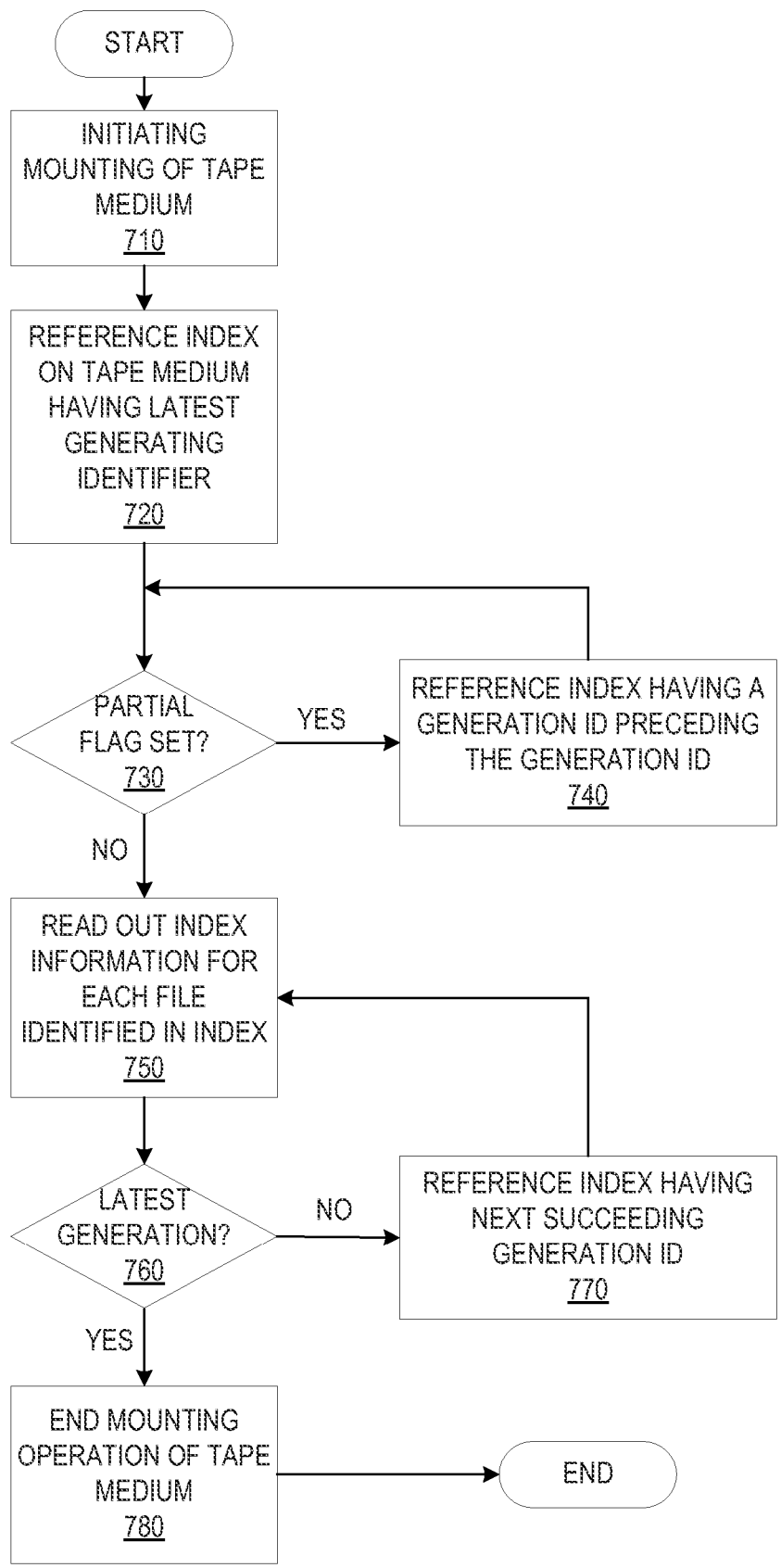
FIG. 7 illustrates a flowchart outlining an example operation, in accordance with the illustrative embodiments, for accessing full and partial indexes.

To illustrate the use of the partial indices further, consider an example scenario in which an index that contains the index information of all of the files recorded on a tape medium is used and a partial index that contains only information for the a subset of the files recorded in the tape medium is used. FIG. 7 illustrates a flowchart outlining an example operation, in accordance with the illustrative embodiments, for accessing full and partial indexes. The operation outlined in FIG. 6 may be implemented, for example, by a storage controller, hardware logic, or any other mechanism implementing a file system that incorporates logic for utilizing partial indexes. It should be noted that when the information of the files of a tape medium are read out, in some cases the indices of plural generations contain the same file information. In such a case, information of an index whose generation number is higher or the highest is adopted.

Essentially, the operation outlined in FIG. 7 looks for the most recent full index that was written to the tape medium and uses that full index as a base index for the reading of index information for the files on the tape medium. The operation then proceeds forward from that generation of index to succeeding generations of partial indexes to build up a current view of the files on the tape medium.

As shown in FIG. 7, the operation starts with the file system (LTFS), initiating the mounting of the tape medium (step 710). Reference is then made to the index on the tape medium having a latest generation identifier (step 720). A determination is made as to whether that index has its partial flag set (on) (step 730). If so, i.e. the index having the latest generation identifier is a partial index, then reference is made to an index having a generation identifier preceding the generation identifier of the currently considered index (step 740).

If the partial index flag is not set for the currently considered index (step 730), then the index information for each of the files identified in the currently considered index is read out (step 750). A determination is then made as to whether this is the latest generation index (step 760). If not, then reference is made to the index having the next succeeding generation identifier (step 770) and the operation returns to step 750 where the data in this next succeeding generation identifier index is read out. If the generation identifier of the currently considered index is the latest generation identifier, then the file system ends the mounting operation of the tape medium (step 780) and the operation terminates.

It should be appreciated that while FIGS. 5 and 6 illustrate that partial indices are written to both the IP and DP of the tape medium, the illustrative embodiments are not limited to such. Rather, one partition, e.g., IP, may continue to use full index writing while another partition, e.g., DP, may use partial index writing. In such an embodiment, the file system of the storage controller, e.g., LTFS, may use known access methods for accessing the fully indexed data of the particular partition, and may make use of the mechanisms of the illustrative embodiments for accessing partial indices for the other partition in which partial indices are utilized.

Thus, in the above described illustrative embodiments, the partial index comprises index information for only the files that have been changed since the writing of the last index. Thus, when writing a partial index in this manner, one need only determine the files that have been changed since the writing of last index and write only the index information for those identified changed files to the tape medium when performing the synchronization operation. This greatly increases the speed by which index information is written to tape media and increases the speed by which synchronization operations, such as are performed during an unmounting of the tape media, are performed.

However, the illustrative embodiments are not limited to only these types of partial indices. To the contrary, in further illustrative embodiments, the partial indices may comprise not only information regarding the files that have changed since a last index was written, but may further include index information for files associated with the changed files. In one illustrative embodiments, these associated files are files that are on the same path, e.g., same directory tree, as the file(s) that were changed. In other illustrative embodiments, these associated files are files that are included in a same virtual directory as the changed file(s).

With regard to the illustrative embodiment in which the files are on the same path as the changed files, it is often the case that file metadata information including, but not limited to, the file names of all files that exist in a certain directory or accessible via the same path, is used. For example, such information is used when handling the "dir" command of the Microsoft Windows™ operating system. In addition, this directory or path information is used when a folder is opened on Microsoft Windows™ Explorer, or the "ls" command of Linux is used. Therefore, it is important to maintain such information current in the indices written to a tape medium, especially for paths in which a file recorded to the tape medium has changed. With the mechanisms of some of the illustrative embodiments described herein, the partial indices of the illustrative embodiments include information about the files that have been changed, but also include the index information for files that are on the same path as the file that was changed.

Figure 8:
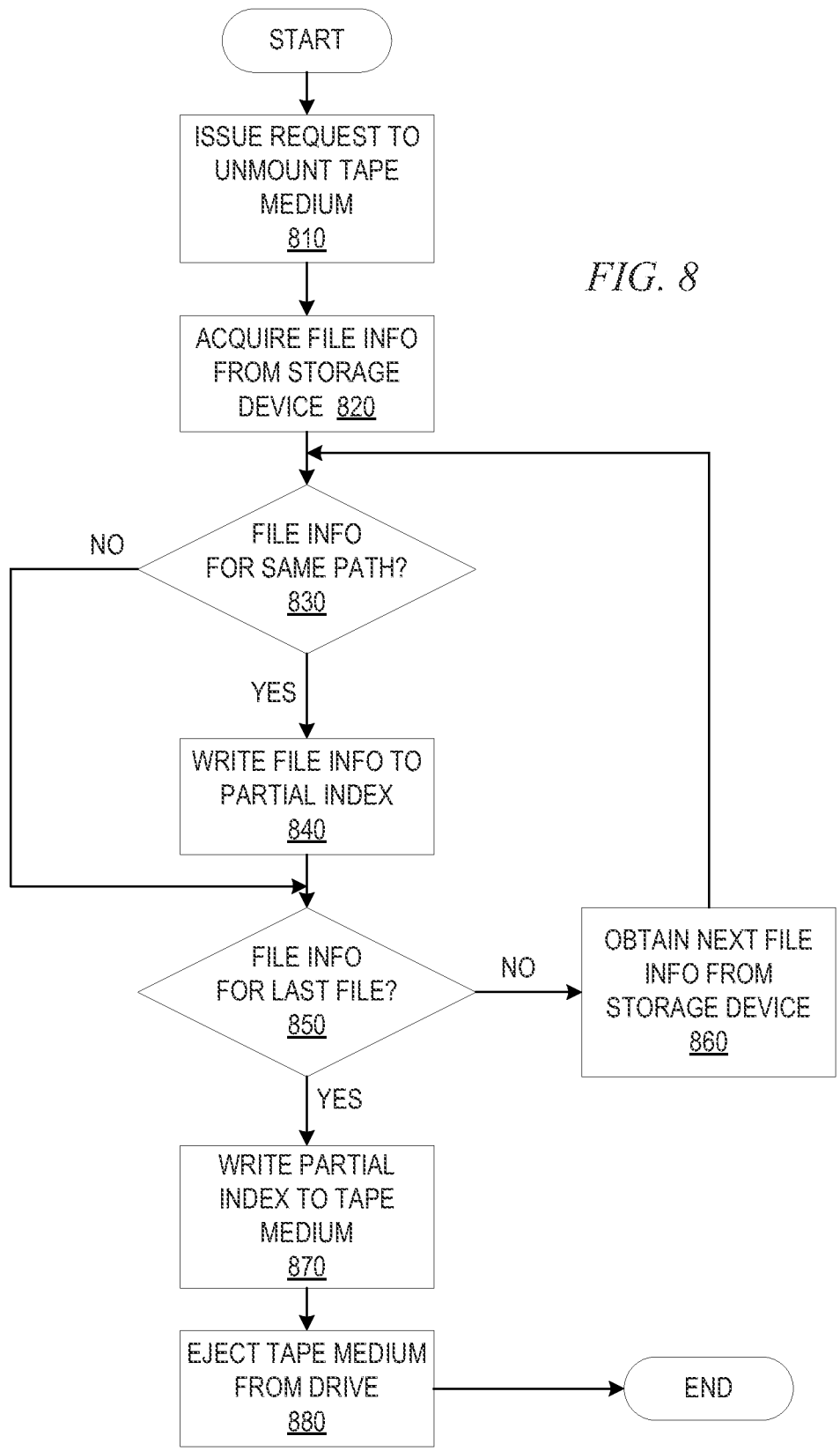
FIG. 8 illustrates a flowchart outlining an example operation for writing a partial index to a tape medium in accordance with one illustrative embodiment in which the partial index includes information for files on a same path as a changed file.

FIG. 8 illustrates a flowchart outlining an example operation for writing a partial index to a tape medium in accordance with one illustrative embodiment in which the partial index includes information for files on a same path as a changed filed. As shown in FIG. 8, the operation starts with the file system (e.g., LTFS) issuing a request for unmounting of a tape medium (step 810). File information for a file stored in the storage device is acquired (step 820) and a determination is made as to whether the file exists on a same path as a changed file (step 830). It should be noted that this would include the changed file itself since it exists on the same path as itself.

If the file does not exist on the same path as a changed file, then the operation jumps to step 850. If the file does exist on a same path as a changed file (step 830), then the index information for the file is written to a partial index (step 840). The operation then determines if this is the information for the last file stored in the storage device (step 850). If not, then the file system acquires the next file information from the storage device (step 860) and returns to step 830. If the information is for the last file in the storage device (step 860), the index is then written to the tape medium (step 870), the tape medium is ejected from the tape drive (step 880), and the unmounting operation is terminated.

It should be noted that with illustrative embodiments in which the partial indices include information regarding files on the same path as a changed file, a same operation as outlined above in FIG. 7 may be used by the file system to perform a mount operation of the tape medium and obtain current index information for the files on the tape medium. That is, regardless of whether the partial index comprises only index information for the changed files, or comprises index information for the changed files and other files on the same path, the same mounting operation may be utilized.

In still other illustrative embodiments, the partial index represents only the index information for the files that are part of a virtual directory that includes the file updated after the writing of the last index. To further illustrate the operation of the illustrative embodiments, it will first be described how files for storage on a tape medium are separated into virtual directories.

Figure 9:
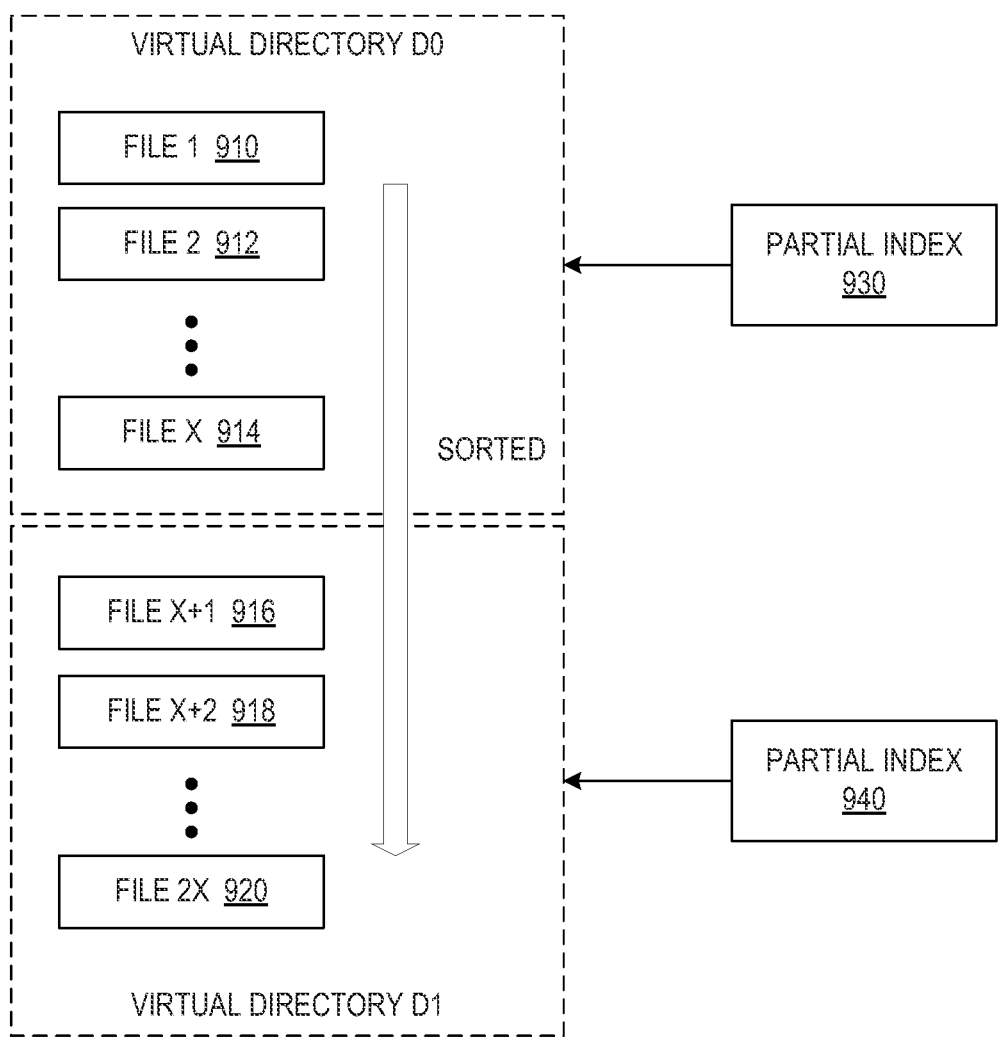
FIG. 9 illustrates an example of the generation of virtual directories of files in accordance with one illustrative embodiment.

FIG. 9 illustrates an example of the generation of virtual directories of files in accordance with one illustrative embodiment. In the depicted example, it is assumed that there are a plurality of files 910-920 having a number greater than or equal to X that exist in a certain directory D, where X is the number of files to be assigned to a virtual directory. The files 910-920, including sub-directories, existing in the directory D may be sorted in one manner or another based on a characteristic of the files. For example, the sorting may be based on an ordering of the names of the files (lexical order), based on a size of the files, based on a creation date of the files, or any other sorting order suitable to the particular implementation.

The first file 910 from the head of the sorted file sequence to the Xth file (where "Xth" means the ordinal number X) are assigned to a virtual directory D0. The X+1th (ordinal number X+1) file to the 2Xth (ordinal number 2X) file are assigned to virtual directory D1, and so on. In this way, virtual directories D0, D1, ..., Dn are generated such that X number or less files belong to, and are included in, each of the virtual directories.

The assignment of files to virtual directories is performed in response to a the creation of more than the Xth file in a directory, either by a user space application, operating system, or any other source of file creation. In other illustrative embodiments, rather than triggering the virtual directory assignment based on the number of files created, the total size of metadata for the files in a directory may be used as triggering criteria for assigning files to virtual directories, since the time to write the index depends on the size of metadata in the index. Other criteria for triggering of virtual directory assignment may be used without departing from the spirit and scope of the illustrative embodiments.

Having divided the files into virtual directories, each of the virtual directories has its own associated partial index 930-940 associated with it that stores the information for the files that are assigned to the corresponding virtual directory. The partial index 930-940 comprises various information including the name of the file, the date of the creation of the file, and the like. The partial index 930-940 may also include the size, path, and the like. The term "file" as used herein should be appreciated to include both regular files as well as directories.

When a change to a file occurs, or a new file is added to a virtual directory, the partial index for the virtual directory corresponding to the changed or new file is written into the DP or IP as a partial index file. The partial index files are smaller than the full index files that are typically used for storing the information for all of the files since the partial index files only store information for the files in the virtual directory with which they are associated. Hence, when writing the partial files to the tape medium, the write operation takes less time to accomplish since the smaller partial index is written only for the virtual directory corresponding to the file that is updated or to which the file is added.

It should be appreciated that while the depicted example assumes that the number of files in each virtual directory are a unit of X files, the illustrative embodiments are not limited to such. Rather, instead of taking the number of files as a unit for division of virtual directories, the virtual directories may be divided on the basis of the amount of information that each index part contains, i.e. depending on how much capacity the index occupies in the entire index. As another illustrative embodiment, the virtual directories may be divided in such a way that the files are assigned to virtual directories based on various characteristics of the file including, for example, the first character from the head of the file name, some portion of characters thereof, a size of the file, or any combination of characteristics.

Figure 10:
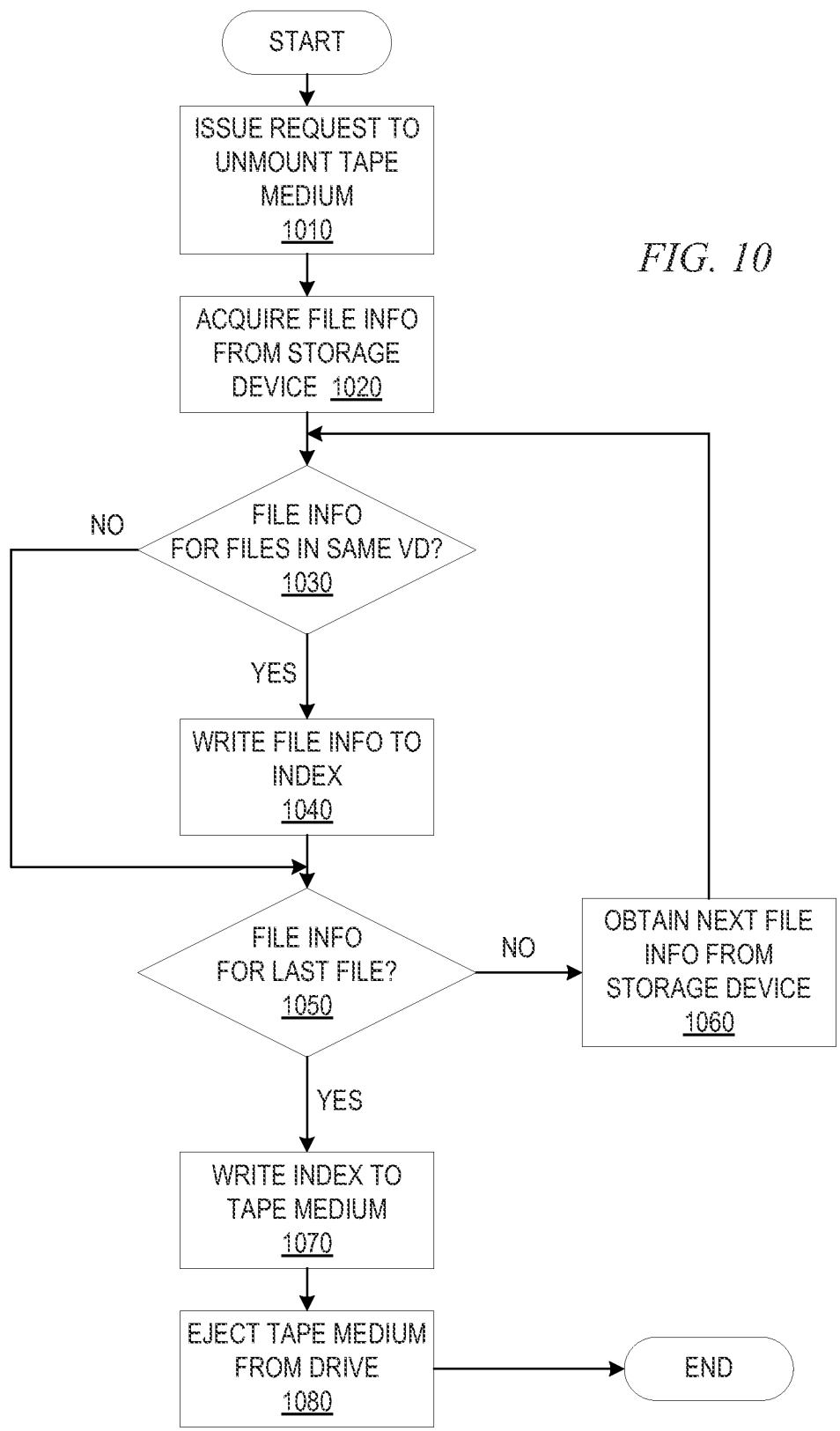
FIG. 10 is a flowchart outlining an example operation for performing an index-write operation at the time of unmounting (or dismounting) of a tape medium in accordance with one illustrative embodiment.

FIG. 10 is a flowchart outlining an example operation for performing an index-write operation at the time of unmounting (or dismounting) of a tape medium in accordance with one illustrative embodiment. The operation outlined in FIG. 10 may be implemented by a tape storage system controller of a tape storage system implementing a file system that is augmented to support the use of virtual directories and partial indexes in accordance with the illustrative embodiments.

As shown in FIG. 10, the operation starts with the LTFS mechanism, implemented in a computing device, issuing a request to a tape drive to unmount or dismount a tape medium from the tape drive (step 1010). In response to the request to unmount the tape medium, file information stored in the storage device, e.g., HDD, flash memory, or other type of storage device, of the data processing system, with which the tape storage system is associated, is acquired (step 1020). This information includes information regarding any added or changed files that were added/changed prior to the unmount request. A determination is made as to whether the file information obtained from the storage device is for files in the same virtual directory as a changed or new file that was generated prior to the unmouting request (step 1030).

If the file information obtained from the storage device is not in the same virtual directory as that of the changed/new file, the operation jumps to step 1050, described hereafter. If the file information obtained from the storage device is in the same virtual directory as that of the changed/new file, the file information is written into the index (step 1040). Thereafter, a determination is made as to whether file information is for the last file that is stored in the storage device (step 1050). If not, the operation obtains the next file information from the storage device (step 1060) and the operation returns to step 1030. In steps 1030-1060, the LTFS mechanisms are creating an index file in the memory of the computing system, e.g., a server, in preparation for writing the index file to the tape medium.

If the file information is for the last file stored in the storage device, then the index is written into the tape medium (step 1070). The tape medium is then ejected from the tape drive (step 1080) and the operation of the unmounting of the tape medium is ended.

Thus, the illustrative embodiments provide mechanisms for utilizing partial indexes to increase the efficiency and speed of performing an unmount or dismount operation for a tape medium. It is quite frequent that file metadata, including but not limited to the file names of all the files that exist in a certain particular directory, is required, such as in the case of a dir command in Microsoft Windows being used, a folder being opened in Microsoft Explorer, or the is command of Linux being used, for example. Thus, it is important to store information of reach directory in an index. On the other hand, in the case where several tens of thousands of files exist in a single directory, just storing an index for each directory does not provide a solution to the problem described earlier, i.e. time taken for unmounting a tape medium being extremely long. In order to solve this problem the illustrative embodiments regard each directory having a large number of files as a set of multiple virtual directories with each virtual directory having its own partial index. In this way, it is possible to reduce time taken for index writing even in the case where a file is added to a directory that includes a large number of files.

As mentioned above, when the dCache function is used, it takes approximately 600 seconds for unmounting a tape medium under the condition of the addition of one file to a tape medium in which 50,000 files have been written previously. In contrast, with the mechanisms of the illustrative embodiments, one can expect that the time taken for unmounting a tape medium will be reduce to 20 seconds or less when a single file is added or changed. This is because the LTFS needs to write the index having information for only the single added/changed file. Since the information to write to the tape medium is only for a single file, the overhead to read the information from the computing device's memory or storage is sufficiently small that only approximately 20 seconds is required for unmounting the tape medium.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a tape storage device that reads and writes data to a tape medium, for performing a synchronization operation for synchronizing data to the tape medium, the method comprising:
   receiving a request to perform the synchronization operation on the tape medium;
   obtaining file information from a storage device of the data processing system in response to receiving the request;
   determining if the file information is associated with a file that has been changed since a last index was written to the tape medium;
   in response to the file information being determined to be associated with a file that has been changed since a last index was written to the tape medium, adding index information corresponding to the file information to a partial index, wherein the partial index comprises index information for files less than a total number of files recorded on the tape medium; and
   writing the partial index to the tape medium.

2. The method of claim 1, wherein the synchronization operation is part of an unmount operation for unmounting the tape medium from the tape storage device, and wherein the method further comprises unmounting the tape medium after writing of the partial index to the tape medium.

3. The method of claim 1, wherein the partial index comprises only index information for the file that was changed since the last index was written to the tape medium and does not comprise a full index of all files recorded on the tape medium.

4. The method of claim 1, wherein the partial index comprises index information for files on a same path as the file that was changed since the last index was written to the tape medium.

5. The method of claim 1, wherein the partial index comprises index information for files in a same virtual directory as the file that was changed since the last index was written to the tape medium.

6. The method of claim 1, wherein determining if the file information is associated with a file that has been changed since a last index was written to the tape medium comprises determining if the file information is for a file that is on a same path as the file that has been changed since the last index was written to the tape medium, and wherein adding index information corresponding to the file information to the partial index is performed in response to determining that the file information is for a file that is on a same path as the file that has been changed since the last index was written to the tape medium.

7. The method of claim 1, wherein determining if the file information is associated with a file that has been changed since a last index was written to the tape medium comprises determining if the file information is for a file in a same virtual directory as the file that has been changed since the last index was written to the tape medium, and wherein adding index information corresponding to the file information to the partial index is performed in response to determining that the file information is for a file that is in a same virtual directory as the file that has been changed since the last index was written to the tape medium.

8. The method of claim 1, wherein writing the partial index to the tape medium comprises writing the partial index to both an index partition and a data partition of the tape medium.

9. The method of claim 1, wherein writing the partial index to the tape medium comprises writing the partial index to one of an index partition or a data partition of the tape medium, and wherein a full index comprising index information for all files recorded on the tape medium is written to an other one of the index partition or the data partition of the tape medium.

10. A computer program product comprising a computer readable storage medium having a computer readable program stored therein, wherein the computer readable program, when executed on a computing device, causes the computing device to:
    receive a request to perform a synchronization operation on a tape medium;
    obtain file information from a storage device of the computing device in response to receiving the request;
    determine if the file information is associated with a file that has been changed since a last index was written to the tape medium;
    in response to the file information being determined to be associated with a file that has been changed since a last index was written to the tape medium, add index information corresponding to the file information to a partial index, wherein the partial index comprises index information for files less than a total number of files recorded on the tape medium; and
    write the partial index to the tape medium.

11. The computer program product of claim 10, wherein the synchronization operation is part of an unmount operation for unmounting the tape medium from the tape storage device, and wherein the computer program product further causes the computing device to unmount the tape medium after writing of the partial index to the tape medium.

12. The computer program product of claim 10, wherein the partial index comprises only index information for the file that was changed since the last index was written to the tape medium and does not comprise a full index of all files recorded on the tape medium.

13. The computer program product of claim 10, wherein the partial index comprises index information for files on a same path as the file that was changed since the last index was written to the tape medium.

14. The computer program product of claim 10, wherein the partial index comprises index information for files in a same virtual directory as the file that was changed since the last index was written to the tape medium.

15. The computer program product of claim 10, wherein the computer program product further causes the computing device to determine if the file information is associated with a file that has been changed since a last index was written to the tape medium at least by determining if the file information is for a file that is on a same path as the file that has been changed since the last index was written to the tape medium, and wherein adding index information corresponding to the file information to the partial index is performed in response to determining that the file information is for a file that is on a same path as the file that has been changed since the last index was written to the tape medium.

16. The computer program product of claim 10, wherein the computer program product further causes the computing device to determine if the file information is associated with a file that has been changed since a last index was written to the tape medium at least by determining if the file information is for a file in a same virtual directory as the file that has been changed since the last index was written to the tape medium, and wherein adding index information corresponding to the file information to the partial index is performed in response to determining that the file information is for a file that is in a same virtual directory as the file that has been changed since the last index was written to the tape medium.

17. The computer program product of claim 10, wherein the computer program product further causes the computing device to write the partial index to the tape medium at least by writing the partial index to both an index partition and a data partition of the tape medium.

18. The computer program product of claim 10, wherein the computer program product further causes the computing device to write the partial index to the tape medium at least by writing the partial index to one of an index partition or a data partition of the tape medium, and wherein a full index comprising index information for all files recorded on the tape medium is written to an other one of the index partition or the data partition of the tape medium.

19. An apparatus, comprising:
a storage device; and
a tape storage device coupled to the storage device, wherein the apparatus comprises logic configured to:
receive a request to perform a synchronization operation on a tape medium of the tape storage device;
obtain file information from the storage device in response to receiving the request;
determine if the file information is associated with a file that has been changed since a last index was written to the tape medium;
in response to the file information being determined to be associated with a file that has been changed since a last index was written to the tape medium, add index information corresponding to the file information to a partial index, wherein the partial index comprises index information for files less than a total number of files recorded on the tape medium; and
write the partial index to the tape medium.

20. A method, in a data processing system comprising a tape storage device that reads and writes data to a tape medium, for mounting the tape medium, the method comprising:
receiving a request to mount the tape medium in the tape storage device, wherein the tape medium comprises at least one full index stored on the tape medium and at least one partial index stored on the tape medium;
identifying a most recent generation index that is a full index stored on the tape medium;
reading first index information from the full index;
iteratively reading second index information from each partial index stored on the tape medium having a generation identifier that is more recent than the most recent generation index that is a full index;
building an index of all files stored on the tape medium from the first index information and second index information; and
mounting the tape medium using the index of all files stored on the tape medium.

* * * * *